(12) United States Patent
Schultz et al.

(10) Patent No.: US 7,331,771 B2
(45) Date of Patent: Feb. 19, 2008

(54) METHOD AND APPARATUS FOR ATTACHING A TRANSMISSION FILTER TO A PUMP

(75) Inventors: John C. Schultz, Saline, MI (US); Kent Johnson, Ypsilanti, MI (US); Uk-Jin Song, Wixom, MI (US)

(73) Assignee: General Motors Corporation, Detroit, MI (US)

(*) Notice: Subject to any disclaimer, the term of this patent is extended or adjusted under 35 U.S.C. 154(b) by 459 days.

(21) Appl. No.: 11/032,552

(22) Filed: Jan. 10, 2005

(65) Prior Publication Data

US 2006/0016740 A1 Jan. 26, 2006

Related U.S. Application Data

(60) Provisional application No. 60/589,282, filed on Jul. 20, 2004.

(51) Int. Cl.
*F04B 23/00* (2006.01)

(52) U.S. Cl. .................... 417/313; 417/423.9
(58) Field of Classification Search ............... 417/313, 417/423.9; 285/376, 401; 210/232, 235, 210/258, 416.1, 454, 459, 460; 403/348, 403/349
See application file for complete search history.

(56) References Cited

U.S. PATENT DOCUMENTS 3,912,423 A * 10/1975 Pfabe .................... 417/313
6,730,218 B2 * 5/2004 Bozenmayer ............ 210/232

* cited by examiner

*Primary Examiner*—Anthony Stashick
*Assistant Examiner*—Vikansha Dwivedi

(57) ABSTRACT

A filter and pump include complementary engagement features such that the filter is inserted into the pump and thereafter rotated approximately 90 degrees to engage a twistlock feature. In this manner, filter attachment is maintained without additional fasteners, spring clips, clamping plates, etc.

14 Claims, 2 Drawing Sheets

Figure 1:
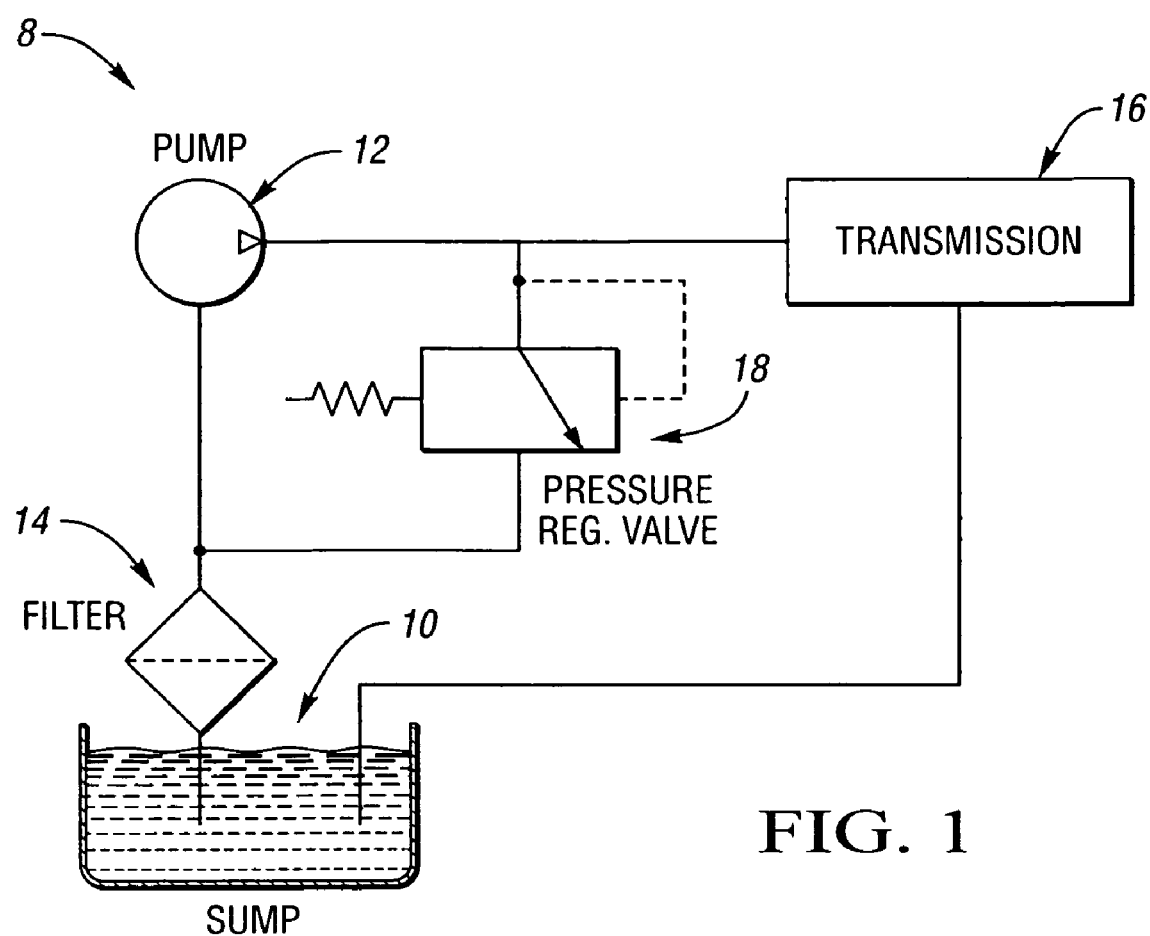
Figure 3:
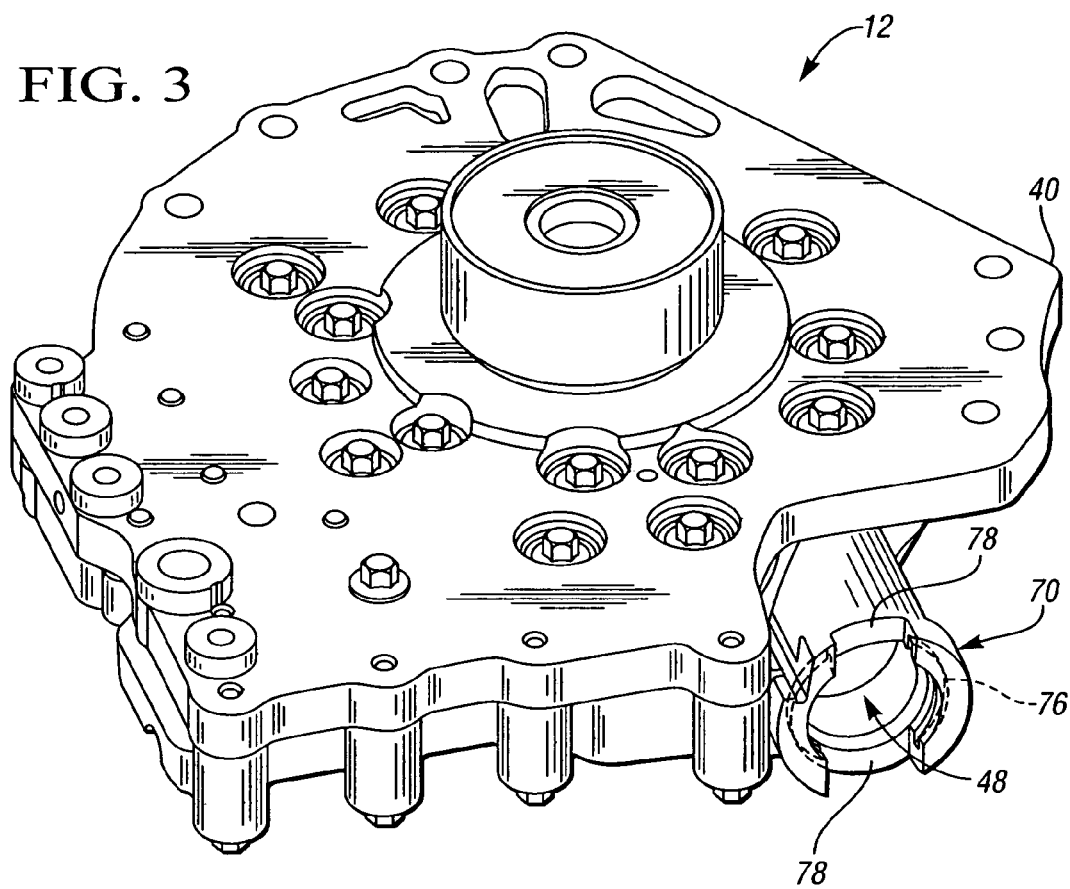
Figure 4:
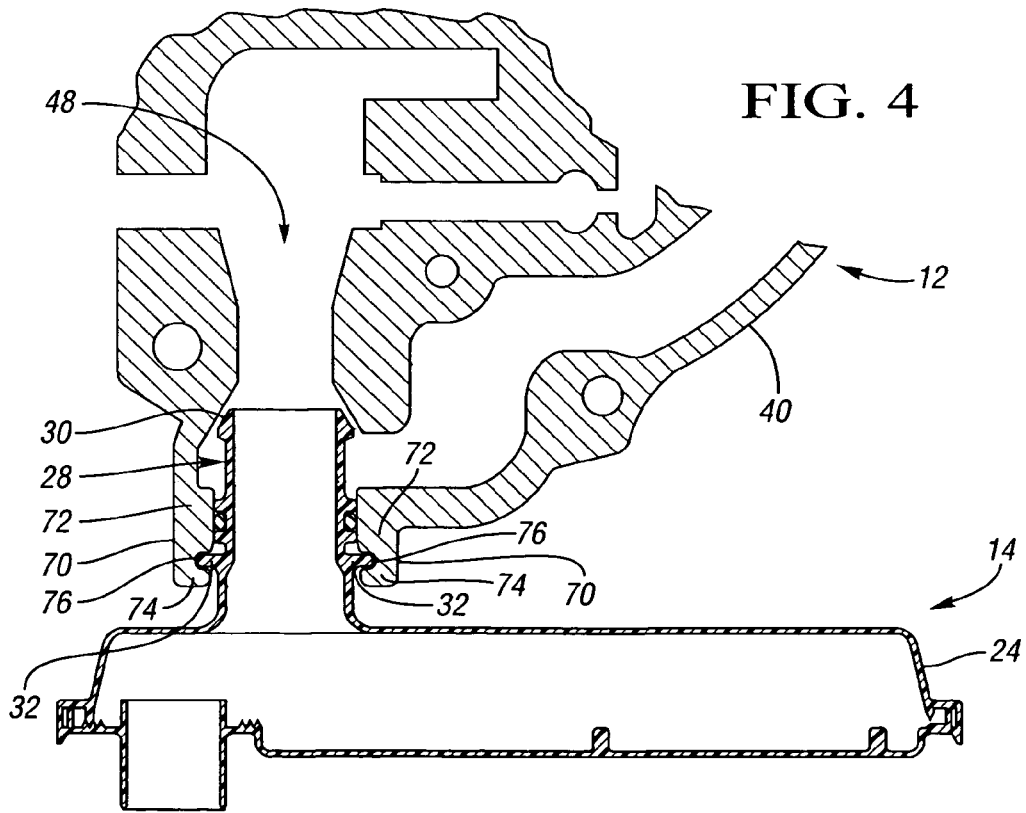

METHOD AND APPARATUS FOR ATTACHING A TRANSMISSION FILTER TO A PUMP

CROSS-REFERENCE TO RELATED APPLICATIONS

This application claims the benefit of U.S. Provisional Application No. 60/589,282, filed Jul. 20, 2004, which is hereby incorporated by reference in its entirety.

TECHNICAL FIELD

According to a preferred embodiment of the present invention, a method and apparatus is provided for conveniently attaching a transmission filter to a pump.

BACKGROUND OF THE INVENTION

Transmission filters and pumps are generally manufactured as individual components and thereafter assembled together as part of a vehicle transmission. Typically such assembly requires fasteners, is labor intensive and is unnecessarily prone to failure. More precisely, implementation of fasteners to assemble the filter to the pump incurs the additional cost associated with the fasteners, requires precision to properly engage the fasteners, and can lead to an inadequate connection between the filter and pump if the fasteners are improperly engaged and/or prematurely fail. Finally, fasteners that are improperly engaged and/or prematurely fail can come loose and result in an objectionable noise while the vehicle is operated.

SUMMARY OF THE INVENTION

It is an object of the present invention to provide an improved method and apparatus for attaching a transmission filter to a pump.

A filter assembly according to a preferred embodiment of the present invention includes a twistlock attachment feature. More precisely, the filter is inserted into the pump and thereafter rotated approximately 90 degrees to engage the twistlock feature. In this manner, filter attachment is maintained without additional fasteners, spring clips, clamping plates, etc., thereby reducing material cost. Elimination of these parts also error proofs the assembled components in that the fasteners, spring clips, clamping plates, etc. cannot inadvertently be dropped into the transmission causing other parts to fail and/or giving rise to an objectionable noise.

In a preferred embodiment, the filter includes a filter nozzle composed of injection molded plastic and integrally extending from a plastic filter housing. In this manner, multiple components can be simultaneously produced from a single mold thereby saving cost associated with manufacturing and assembly.

The above features and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic diagram of a portion of a hydraulic system incorporating the present invention;

FIG. 2 is an isometric view of a filter assembly incorporating the present invention;

FIG. 3 is an isometric view of a pump assembly incorporating the present invention; and FIG. 4 is a sectional view of a portion of the filter assembly shown in FIG. 2 attached to the pump assembly shown in FIG. 3.

DESCRIPTION OF THE PREFERRED EMBODIMENTS

Referring to the drawings wherein like characters represent the same or corresponding parts through the several views, there is seen in FIG. 1 a schematic representation of a transmission fluid distribution system 8 which includes a sump or reservoir 10 preferably containing hydraulic fluid. A transmission pump 12 draws the hydraulic fluid from the reservoir 10 through a filter 14. The pump 12 delivers pressurized hydraulic fluid to a transmission 16. The maximum pressure at the pump outlet is determined by a pressure regulator valve 18, which delivers excess pump flow to the filter 14. According to a preferred embodiment of the present invention, the hydraulic fluid first satisfies the transmission pressure requirements, then satisfies the torque converter pressure requirements, then supplies some lube and cooling, and thereafter the excess fluid is returned to the filter 14.

Referring to FIG. 2, the filter assembly 14 includes a housing 24 which has a filter element (not shown) secured therein. A generally cylindrical filter outlet portion 28 extends substantially perpendicular from the housing 24, and according to a preferred embodiment the outlet portion 28 terminates in a filter nozzle 30. At least a portion of the housing 24, the filter outlet portion 28 and the nozzle 30 are preferably a single injection molded component. This embodiment is particularly advantageous in that the filter assembly 14 incorporates an annular nozzle design without additional parts such as a conical insert to create the nozzle function.

The filter outlet portion 28 preferably includes an engagement flange 32. The engagement flange 32 extends in a radially outward direction from the filter outlet portion 28 and is disposed about the circumference thereof. According to a preferred embodiment, the engagement flange 32 defines opposed recessed portions 34. The engagement flange 32 in conjunction with a complementary shoulder 70 (shown in FIG. 3 and described in detail hereinafter) form a twistlock feature adapted to maintain engagement of the filter 14 and pump 12 without additional fasteners.

Referring to FIG. 3, the pump 12 includes a housing 40 configured to define a generally cylindrical inlet bore 48. The inlet bore 48 is adapted to receive the filter outlet portion 28 (shown in FIG. 2). The diameter of the inlet bore 48 is reduced by the shoulder 70 adapted to accommodate the engagement flange 32 and thereby maintain engagement of the filter assembly 14 (shown in FIG. 2) and the pump 12. As best shown in FIG. 4, the shoulder 70 includes a downstream portion 72 and an upstream portion 74 which define a slot 76 therebetween. Referring again to FIG. 3, the shoulder 70 further includes opposed notched portions 78.

To assemble the filter 14 to the pump 12, the filter outlet portion 28 is inserted into the pump inlet bore 48 such that the engagement flange 32 is aligned with the notched portions 78 of the shoulder 70. Thereafter, the filter 14 is rotated approximately 90 degrees relative to the pump 12 such that the engagement flange 32 is retained in the pump slot 76. Therefore, the engagement flange 32 of the filter 14 and the shoulder 70 of the pump 12 cooperate to form a twistlock feature whereby the filter 14 is assembled to the pump 12 without any additional fasteners. FIG. 4 shows the filter 14 assembled to the pump 12 such that the engagement flange 32 is disposed within the slot 76, and the engagement flange 32 is locked into position by downstream portion 72 and upstream portion 74 of the shoulder 70.

In a preferred embodiment, the present invention may be implemented with the nozzle feature disclosed in U.S. Provisional Application No. 60/589,275 entitled "Improved Transmission Pump and Filter," filed Jul. 20, 2004, which is hereby incorporated by reference in its entirety. Advantageously, manufacturing tolerance of the engagement flange 32 and the pump slot 76 are capable of maintaining a nozzle passage 64 (shown in FIG. 2 of the incorporated Application) width of 1.5±0.5 mm. It has been established that such a nozzle passage width effectively minimizes cavitation, as described in the incorporated application, within the entire range of variation, thereby yielding robust performance from the nozzle in conjunction with the ease of assembly of the present invention. It has further been established that the injection molded embodiment provides an interface between the engagement flange 32 and the shoulder 70 is sufficiently strong to resist the back pressure of the nozzle (described in detail in the incorporated application). This embodiment is particularly advantageous because metal plates and corresponding fasteners are not required for implementation, thereby reducing cost associated with additional components and assembly.

While the best modes for carrying out the invention have been described in detail, those familiar with the art to which this invention relates will recognize various alternative designs and embodiments for practicing the invention within the scope of the appended claims.

The invention claimed is:

1. A pump and filter assembly comprising:
    a pump having a pump housing defining a pump inlet bore, said pump housing including a shoulder formed at said inlet bore, said shoulder having an upstream portion, a downstream portion and a slot defined therebetween, said shoulder defining opposed notched portions in communication with said slot; and
    a filter having a filter housing having a filter outlet portion adapted to extend into said pump inlet bore of said pump housing, said filter outlet portion including:
        an engagement flange disposed about the circumference of said filter outlet portion, said engagement flange defining opposed recessed portions to enable insertion of the engagement flange into the opposed notched portions and rotational movement into the slot, wherein said engagement flange is disposed within said slot of said pump housing and retained by said upstream portion and said downstream portion of said shoulder to assemble said pump and filter.

2. The pump and filter assembly of claim 1, wherein said filter outlet portion includes a filter nozzle.

3. The pump and filter assembly of claim 2, wherein said filter outlet portion integrally extends from said filter housing.

4. The pump and filter assembly of claim 3, wherein said filter nozzle integrally extends from said filter outlet portion.

5. The pump and filter assembly of claim 4, wherein said filter housing is composed of injection molded plastic.

6. The pump and filter assembly of claim 5, wherein said engagement flange of the filter outlet portion is adapted to withstand a backpressure force inherent in the operation of said pump and filter.

7. The pump and filter assembly of claim 1, wherein a manufacturing tolerance of said pump housing slot and said filter engagement flange are capable of maintaining a nozzle passage width of 1.5+/−0.5 mm.

8. A pump and filter assembly comprising:
    a pump assembly including pump housing defining a pump inlet bore, said pump housing having a shoulder defined at said inlet bore, said shoulder having an upstream portion, a downstream portion and a slot defined therebetween, said shoulder defining opposed notched portions; and
    a filter assembly including
        a filter housing; and
        a filter outlet portion integrally extending from said filter housing, said filter outlet portion adapted to partially extend into said pump inlet bore of said pump housing, said filter outlet portion including:
            a terminal end defining a filter nozzle; and
            an engagement flange disposed about the circumference of said filter outlet portion, said engagement flange defining opposed recessed portions to enable insertion of the engagement flange into the opposed notched portions and rotational movement into the slot, wherein said engagement flange is disposed within said slot of said pump housing and retained by said upstream portion and said downstream portion of said shoulder to assemble said pump and filter.

9. The pump and filter assembly of claim 8, wherein said filter housing is composed of injection molded plastic.

10. The pump and filter assembly of claim 9, wherein said filter nozzle is an integral part of said filter outlet portion.

11. The pump and filter assembly of claim 10, wherein said engagement flange of the filter outlet portion is adapted to withstand a backpressure force inherent in the operation of said pump and filter assembly.

12. The pump and filter assembly of claim 8, wherein a manufacturing tolerance of said pump housing slot and said filter engagement flange are capable of maintaining a nozzle passage width of 1.5+/−0.5 mm.

13. A method for assembling a transmission filter to a pump, said method comprising:
    providing a pump assembly including a pump housing defining a pump inlet bore, said pump housing having a shoulder formed at said inlet bore, said shoulder having an upstream portion, a downstream portion and a slot defined therebetween, said shoulder defining opposed notched portions;
    providing a filter assembly having a filter outlet portion, said filter outlet portion having an engagement flange disposed about the circumference of said filter outlet portion, said engagement flange defining opposed recessed portions;
    inserting the filter outlet portion of the filter assembly into the inlet bore of the pump housing such that the engagement flange of the filter outlet portion is aligned with the opposed notched portions of the pump assembly; and
    rotating the filter assembly relative to the pump such that the engagement flange of the filter outlet portion is rotated into the slot of the shoulder and the engagement flange of the filter outlet portion is retained by the upstream portion and the downstream portion of the shoulder.

14. The method of claim 13, wherein said rotating step comprises rotating the filter assembly approximately 90 degrees relative to the pump.

* * * * *